(12) United States Patent
Cebulla et al.

(10) Patent No.: US 7,089,346 B2
(45) Date of Patent: Aug. 8, 2006

(54) METHOD OF OPERATING A CROSSBAR SWITCH

(75) Inventors: Markus Cebulla, Gerstetten (DE);
Gottfried Andreas Goldrian, Boeblingen (DE); Bernd Leppla, Buchen-Boedigheim (DE); Norbert Schumacher, Neuhausen (DE)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 10/378,365

(22) Filed: Mar. 3, 2003

(65) Prior Publication Data
US 2004/0073739 A1    Apr. 15, 2004

(30) Foreign Application Priority Data
Mar. 6, 2002   (EP) .................. 02004989

(51) Int. Cl.
*G06F 13/00* (2006.01)
(52) U.S. Cl. ................... 710/317; 710/316
(58) Field of Classification Search .......... 710/317, 710/305; 345/502; 714/34; 711/209
See application file for complete search history.

(56) References Cited

U.S. PATENT DOCUMENTS

| 3,689,897 A | * | 9/1972 | Sciuchetti | .................. 710/317 |
| 4,217,640 A | * | 8/1980 | Porter et al. | .................. 714/34 |
| 4,811,210 A | * | 3/1989 | McAulay | .................. 710/317 |
| 5,428,750 A | * | 6/1995 | Hsieh et al. | .................. 710/305 |
| 5,446,839 A | * | 8/1995 | Dea et al. | .................. 345/502 |
| 5,559,971 A | * | 9/1996 | Hsieh et al. | .................. 710/317 |
| 5,765,023 A | * | 6/1998 | Leger et al. | .................. 710/22 |
| 5,860,149 A | * | 1/1999 | Fiacco et al. | .................. 711/209 |
| 6,615,302 B1 | * | 9/2003 | Birns | .................. 710/121 |
| 6,738,858 B1 | * | 5/2004 | Fernald et al. | .................. 710/317 |
| 6,836,815 B1 | * | 12/2004 | Purcell et al. | .................. 710/317 |
| 6,839,795 B1 | * | 1/2005 | Fernald et al. | .................. 710/317 |
| 6,915,372 B1 | * | 7/2005 | Magill et al. | .................. 710/317 |

OTHER PUBLICATIONS

Morris Mano, Computer System Architecture, 1982. Prentice-Hall, Inc., 2nd Ed., pp. 500-501.*
Eiji Oki, et al., "Scalable Crosspoint Buffering ATM Switch Architecture Using Distributed Arbitration Scheme", 1997, IEEE.*
Roberto Rojas-Cessa, et al., "CIXB-1: Combined Input-One-Cell-Crosspoint Buffered Switch", 2001, IEEE.*
Adisak Mekkittikul, et al., "A Practical Scheduling Algorithm to Achieve 100% Throughput in Input-Queued Switches", 1998, IEEE.*

* cited by examiner

*Primary Examiner*—John R. Cottingham
*Assistant Examiner*—Justin King
(74) *Attorney, Agent, or Firm*—John E. Campbell; Floyd A. Gonzalez (57) ABSTRACT

The present invention relates to a method of operating a crossbar switch (1) having a control logic (2) and n input ports (i_0, ..., i_n-1) and m output ports (o_0, ..., o_m-1), wherein information packets of p different priority levels are routed from said n input ports (i_0, ..., i_n-1) to said m output ports (o_0, ..., o_m-1). Within said control logic (2), a pool (CRA) of buffers (CRA_0, CRA_1, ...) is provided for each crosspoint (4) for temporarily storing address information related to said information packets.

26 Claims, 6 Drawing Sheets

METHOD OF OPERATING A CROSSBAR SWITCH

BACKGROUND OF THE INVENTION:

The present invention relates to crossbar switches, and in particular to a method of operating a crossbar switch having a control logic and n input ports and m output ports, wherein information packets of p different priority levels are routed from said n input ports to said m output ports.

The present invention further relates to a crossbar switch having a control logic and n input ports and m output ports wherein information packets of p different priority levels are routed from said n input ports to said m output ports.

Additionally, the present invention relates to a networking system with at least one crossbar switch.

Crossbar switches are used in high performance computer systems and nodes of electronic networks such as communication networks to route an information packet arriving at an arbitrary input port to a specified output port.

A crossbar switch comprises n input crossbars each of which is assigned to one of said n input ports and m output crossbars each of which is assigned to one of said m output ports. An intersection of an input crossbar with an output crossbar is called crosspoint.

The routing of an information packet within a crossbar switch is controlled by a control logic that keeps track of incoming information packets. The control logic analyses header data of said information packets and stores address information related to said information packets in a buffer system which is reserved for this purpose and is assigned to the control logic.

The payload of said information packets is stored in a separate data buffer system according to said address information maintained by the control logic. Storing said address information and the corresponding payload avoids packet losses e.g. in case of multiple packets requiring to be routed to the same output port.

Advanced crossbar switches can handle information packages of different priorities. This feature ensures that packets with higher priority are routed to a specific output port first, even if packets with lower priority requiring the same output port have arrived at the crossbar switch earlier.

A further advanced feature, which is known as link paralleling, comprises temporarily building a logical input/output port out of several physical input/output ports. The bandwidth of such a logical port is increased by a factor corresponding to the number of physical ports used for link paralleling.

Within state-of-the-art crossbar switches, said buffer system of the control logic comprises buffers which are organized as linked lists or as FIFO-buffers. As already mentioned, the payload is stored in a separate data buffer.

A common approach regarding the buffer system of the control logic is to assign a buffer for storing address information to each crosspoint of the crossbar switch. Though it is possible to provide a single common data buffer for storing the payload of all incoming packets, another variant is referred to for the further explanations. This variant is characterized in that each crosspoint also has a dedicated data buffer for only storing the payload of the information packets referenced by the address information of the corresponding control logic buffer assigned to that crosspoint. The plurality of dedicated data buffers is also referred to as data buffer array in the present disclosure.

The following explanations refer to a single crosspoint of the crossbar switch and the corresponding buffer management.

The linked list buffer mechanism is not favorable since it only allows to read one address entry per cycle which for example is not sufficient for link paralleling. Especially in case of different priorities, traversing the linked list buffer takes too much time.

Using a FIFO-buffer avoids the lengthy operation of traversing the linked list. However, if there is more than one priority level, for each priority an extra buffer must be provided. This, in turn, has another advert effect. For example, if there are $g\_CRA=32$ buffer entries provided in said data buffer for storing the payload of thirty-two information packets, the control logic of a crossbar switch supporting $p=8$ priority levels requires $8\times32=256$ FIFO-buffer entries for each crosspoint. Although there must be 256 FIFO-buffer entries provided, solely a maximum of 32 information packets, or their payload, respectively, can be stored by said FIFO-buffer in case of all packets having the same priority.

SUMMARY OF THE INVENTION:

Accordingly, it is an object of the present invention to provide an improved method of operating a crossbar switch which requires fewer buffer memory within a crossbar switch while at the same time supporting multiple priority levels and a link paralleling mode.

According to the present invention, this object is achieved by providing for each crosspoint a pool of buffers within said control logic and by temporarily storing address information related to said information packets in said pool of buffers. The main advantage of said pool of buffers is the flexibility of storing said address information. Whenever a packet arrives at an input port of the crossbar switch, it is stored in a buffer being member of said pool of buffers. If said packet is the first packet with a certain priority level, a new, empty buffer is taken from the pool and is reserved for packets of said priority level. Following incoming packets will also be written to said buffer, provided the have the same priority level as well.

Incoming packets with a different priority level are written to other buffers of said pool which have previously been reserved for different priority levels.

As can be seen, for each incoming packet with a new priority level, a new, empty buffer of said pool is reserved for said new priority. That is, in the worst case, there is only one packet with a distinct priority level which causes a new, previously unused buffer to be reserved for said priority, even if there are no further packets of said priority. As a consequence, in a buffer having $i\_CRA$ buffer entries, $i\_CRA-1$ buffer entries remain unused unless said packet is read from the buffer and the buffer is put back to the pool of buffers.

Without said pool of buffers, in known crossbar switches there are either for each priority $g\_CRA$ buffers, which number $g\_CRA$ corresponds to the total number of data buffers entries per crosspoint, resulting in a very large number of buffers per crosspoint, or there is a complex and slow control logic using linked lists or similar mechanisms leading to lacking flexibility, especially regarding link paralleling modes.

However, since the number $i\_CRA$ of buffer entries within such a buffer being member of said pool of buffers of the control logic—according to the present invention—is smaller than the number $g\_CRA$ of buffer entries provided in said data buffer for storing the payload corresponding to said packets, there are buffer savings compared to state-of-the-art systems.

A further advantageous embodiment of the present invention is characterized by providing each of said buffers with the same number e_CRA of buffer entries, which reduces buffer administration overhead within a pool of buffers since a distinction regarding buffers and their entries, respectively, must not be made.

A further advantageous embodiment of the present invention is characterized in that said buffers are provided with different numbers of buffer entries. Though requiring a more complex control logic, in special cases it can be of great advantage to adapt the number of buffer entries and consequently the buffer size, too, within a pool of buffers.

A further advantageous embodiment of the present invention is characterized in that a number n_CRA of buffers in said pool is determined with the following equation:

$$n\_CRA = \sum_{\substack{i=1, \\ 2 \cdot i < g\_CRA}}^{p-1} 2 \cdot i + \begin{cases} int(a) + 1, & \text{if } a = int(a) \\ int(a) + 2, & \text{if } a \neq int(a) \end{cases}$$

Wherein $$a = \frac{g\_CRA - 2 \cdot (p-1) - 1}{e\_CRA}$$

and wherein g_CRA denotes a maximum number of information packets that can be stored in a data buffer related to a crosspoint.

Based on input values such as the overall number of packets to be stored within a crosspoint and several additional parameters, the equation gives the number n_CRA of buffers that must be provided within a pool of buffers to ensure that even in the worst case no incoming packet is lost.

Another advantageous embodiment of the present invention is characterized in that said buffers operate as FIFO-buffers thus avoiding the disadvantages of linked list buffers.

A further advantageous embodiment of the present invention is characterized in that the availability of said buffers is monitored and/or controlled in said pool by an address data manager. A very efficient address data manager comprises a bit vector having n_CRA bits, wherein each of said n_CRA bits denotes one of said n_CRA buffers of said pool of buffers. If a bit is set, the buffer corresponding to this bit of the bit vector can be allocated. If the bit is not set, this indicates that the buffer is currently allocated.

A further advantageous embodiment of the present invention is characterized by using p_wp write pointers within said pool, each of which indicates a write location for the corresponding priority level. Write location in this context describes one of the buffers used for a distinct priority, i.e. if using a binary coding to enumerate the buffers of a pool, a certain binary value of the write pointer denotes the buffer to which the next packet of the corresponding priority is to be written to. Binary coding of the write pointer is the preferred solution since the number of bits for coding the write pointer is proportional to the logarithm of the number n_CRA of buffers.

An exact write position within a buffer can be defined by assigning a location pointer to each of said buffers. This location pointer points to the next free buffer entry within a buffer and can advantageously be combined with a write pointer of a priority level. The location pointer is binary coded, too.

Consequently, in a first step, the write pointer is evaluated to find a buffer in the pool, and in a second step, the location pointer of the buffer so determined is evaluated yielding the buffer entry determined for the next write operation.

A further advantageous embodiment of the present invention is characterized by using p_rd read pointers within said pool, each of which indicates a read location for the corresponding priority level. A read pointer denoting a certain buffer can also be combined with a location pointer of a buffer, in particular with the location pointer of the buffer referenced by the read pointer so as to exactly define a next buffer entry for the following read operation.

Alternatively, with another advantageous embodiment of the present invention, said read/write pointer(s) comprise(s) buffer identifier information and/or location information. The contents of the read/write pointer already comprise information which buffer entry to use next, so that the corresponding entry can be accessed instantaneously.

A further advantageous embodiment of the present invention is characterized by setting a valid bit of a buffer if a first buffer entry has been written to said buffer. The valid bit enables an easy and efficient detection of unused buffers and does not require a complex control logic. In a further advantageous embodiment of the present invention, the valid bit of a buffer is reset if a last buffer entry of the buffer has been read, i.e. the buffer can be freed again.

A further advantageous embodiment of the present invention is characterized by assigning a value of a buffer identifier of a second buffer to a sequence pointer of a first buffer. This is very useful if there are more packets of one priority as there are buffer entries provided within one buffer. In this case, when the first buffer is full, its sequence pointer is given the value of a buffer identifier of a free buffer that is to be used for storing the following packets of the same priority. Usually, the sequence pointer is binary coded.

This procedure can be interpreted as building a linked list of buffers, but since according to the invention there is a read/write pointer for each priority, this linked list of buffers need not be traversed for any read/write operation. The corresponding read/write location is directly pointed to by the read/write pointer, and an exact buffer entry can be determined by additionally evaluating the buffer's location pointer.

A further advantageous embodiment of the present invention is characterized by rearranging information packets according to a predetermined mode by using at least one auxiliary crossbar switch. Depending on the mode of rearranging, in certain modes of operation of the crossbar switch a performance loss can be avoided by rearranging packets, especially by rearranging incoming information packets.

Concerning a crossbar switch of the above mentioned type, a further inventive solution to the object of the present invention is characterized in that for each crosspoint the pool of buffers is provided within said control logic for temporarily storing address information related to said information packets in said pool of buffers.

BRIEF DESCRIPTION OF THE DRAWINGS

These and other objects will be apparent to one skilled in the art from the following detailed description of the invention taken in conjunction with the accompanying drawings in which:

FIG. 1b shows a crosspoint of the crossbar switch of FIG. 1a;

DESCRIPTION OF THE PREFERRED EMBODIMENT

Figure 1A:
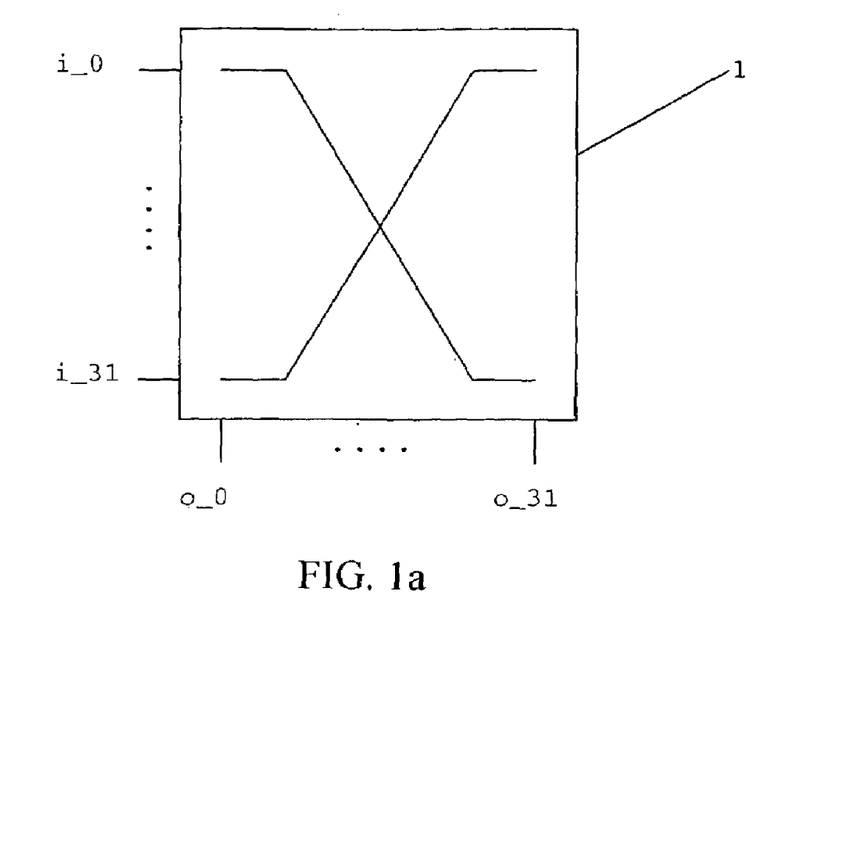
FIG. 1a is a schematic representation of a common crossbar switch.

The crossbar switch 1 schematically depicted in FIG. 1a comprises 32 input ports i_0, ..., i_31 and 32 output ports o_0, ..., o_31. It is capable of routing information packets incoming at an arbitrary input port to one of said output ports o_0, ..., o_31.

Crossbar switch 1 has a plurality of input crossbars (not shown), each of which is connected to one of the input ports i_0, ..., i_31. Further, crossbar switch 1 has a plurality of output crossbars, each of which is connected to one of the output ports o_0, ..., o_31.

An intersection of an input crossbar with an output crossbar is called crosspoint 4. A crosspoint 4 represents the physical connection of an input port and an output port via the corresponding input/output crossbars and is schematically shown in FIG. 1b.

Figure 1B:
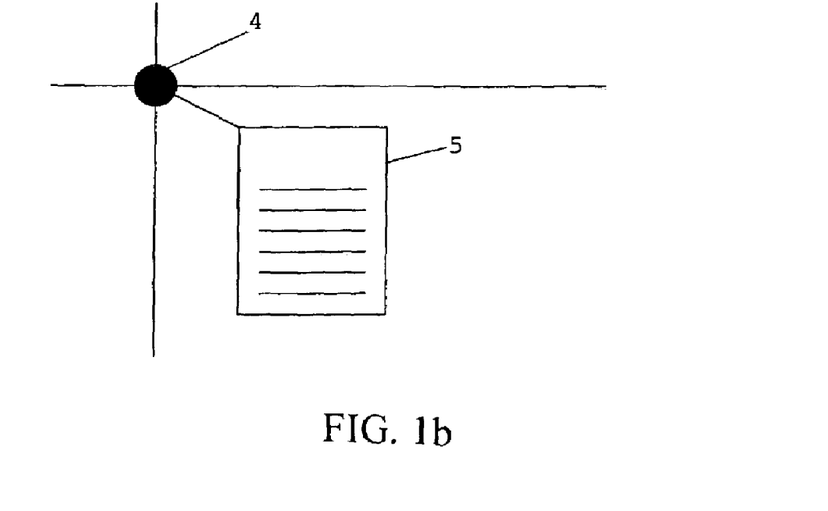

As can be seen from FIG. 1b, a buffer comprising a plurality of buffer entries 5 is assigned to said crosspoint. The buffer is usually employed for temporarily storing information packet data which is routed from an input port to an output port by the crossbar switch 1.

Figure 2:
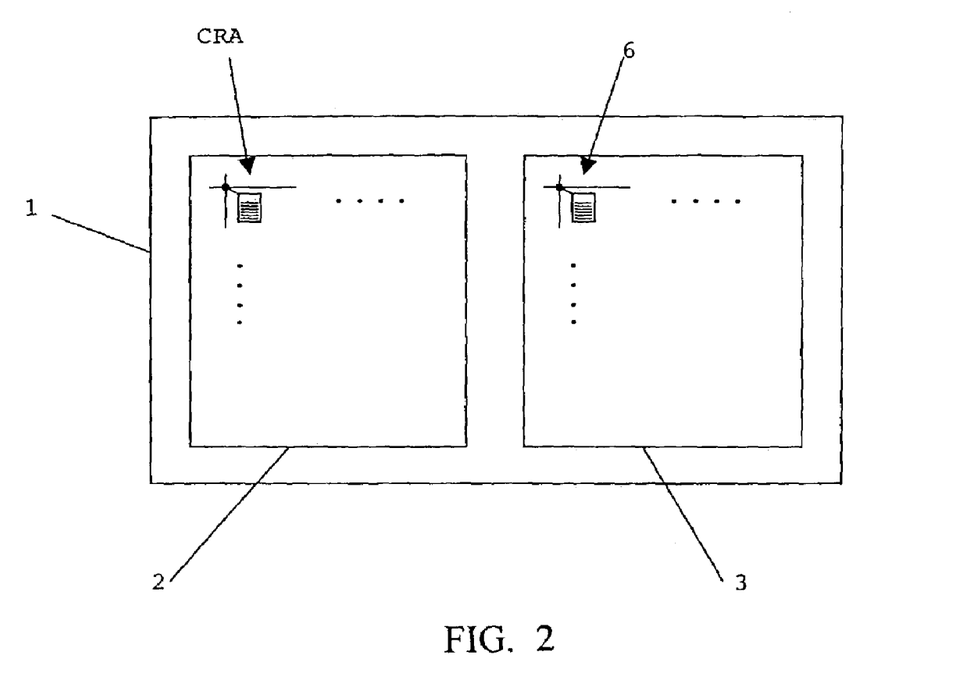
FIG. 2 shows a control logic section 2 and a data buffer array 3 of a crossbar switch 1 capable of performing the method according to the invention.

Generally, the crossbar switch 1 of FIG. 1a comprises a control logic 2 and a data buffer array 3 as depicted in FIG. 2. The control logic 2 is used for storing address and/or other header data of received packets, whereas said data buffer array 3 only contains the payload portion of received packets.

The dots in FIG. 2 symbolize that the above explained crossbar switch structures (FIG. 1b) comprising input crossbars and output crossbars can both be found in said control logic 2 and said data buffer array 3, i.e. the mechanism of routing packet header data is basically the same as routing the corresponding payload. Yet, there is a difference regarding the buffer structure.

Figure 3A:
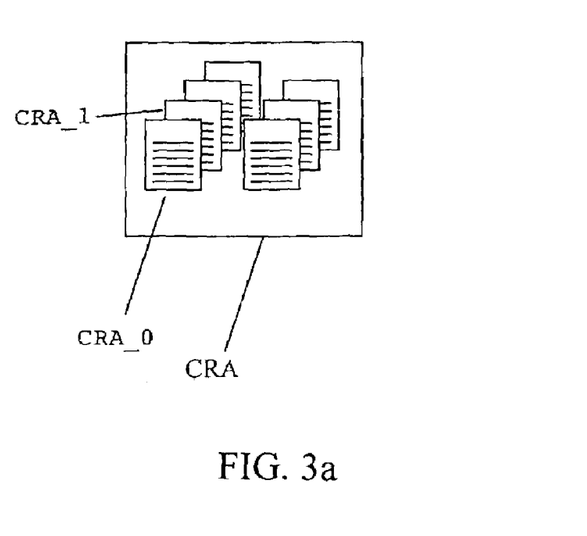
FIG. 3a shows pool CRA of buffers.

FIG. 3a shows a pool CRA of buffers CRA_0, CRA_1, ..., wherein individual buffer entries are symbolized by a horizontal line. Regarding the buffers CRA_0, CRA_1, ..., comprised in the control logic 2, these buffer entries are used to store address information of incoming packets.

More precisely, a distinct buffer entry of e.g. the buffer CRA_0 of a distinct crosspoint 4 contains a pointer that represents a memory address in a data buffer 6 of the data buffer array 3, the mentioned data buffer 6 being assigned to the same distinct crosspoint 4.

Figure 3B:
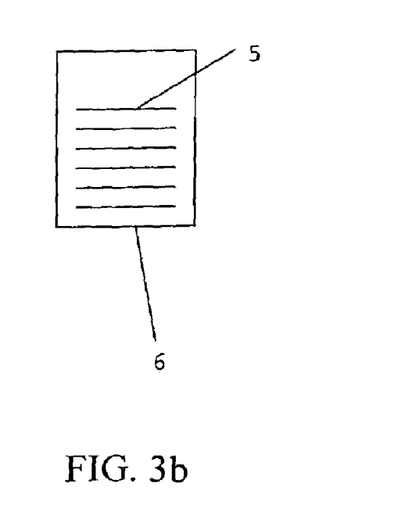
FIG. 3b shows a data buffer 6 with its g_CRA buffer entries 5.

FIG. 3b shows said data buffer 6 which is, as described above, part of the data buffer array 3 depicted in FIG. 2. The data buffer 6 has g_CRA buffer entries 5, so that at maximum g_CRA information packets' payload can be stored there. Within the data buffer 6, no distinction regarding the priority level of a data packet is made. Generally, the data buffer 6 comprises the payload of several packets that can have different priority levels.

Figure 4:
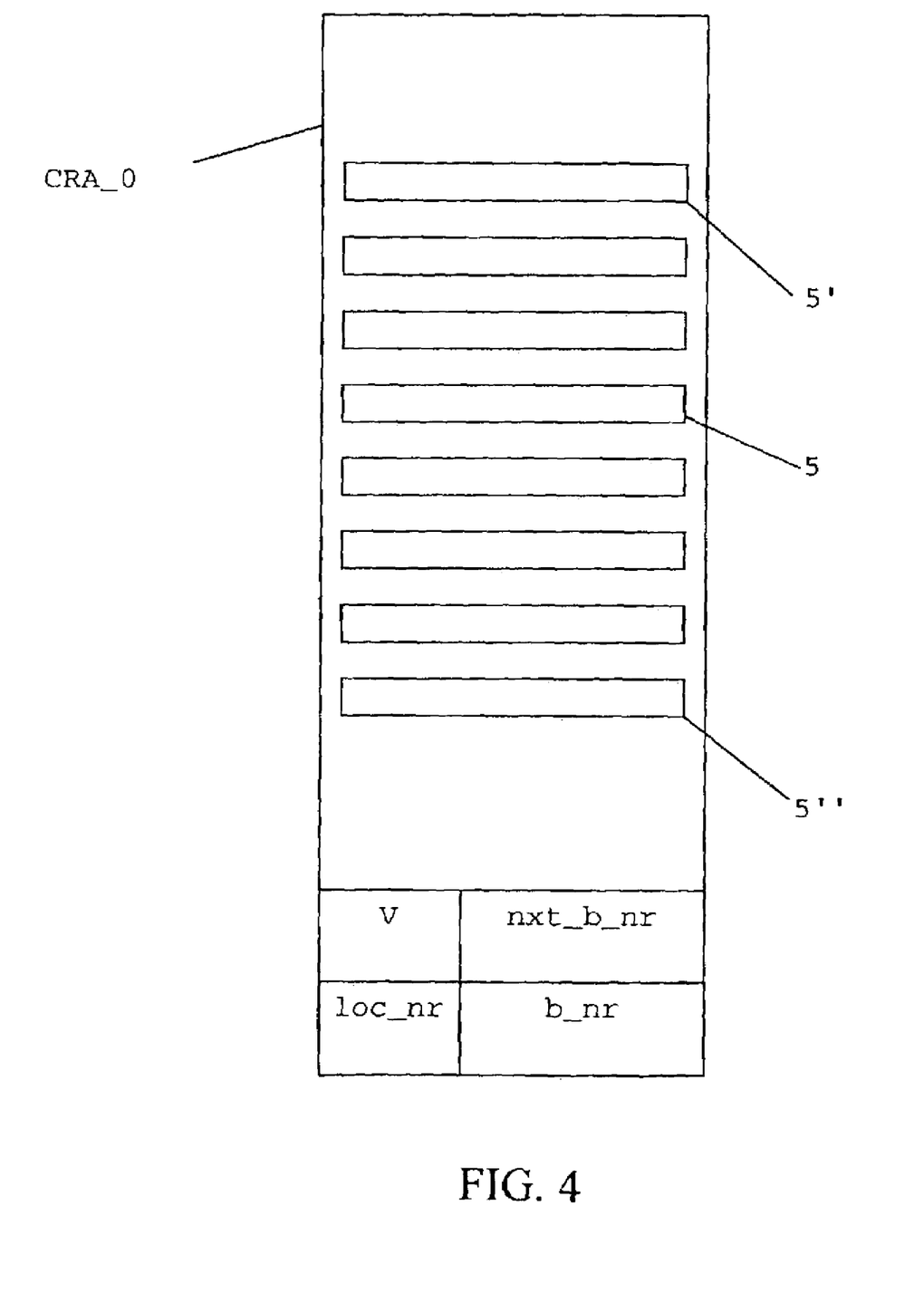
FIG. 4 shows an empty buffer CRA_0 being member of said pool CRA of buffers.

FIG. 4 shows a buffer CRA_0 of said pool CRA of buffers CRA_0, CRA_1, .... As can be seen, the buffer CRA_0 comprises eight buffer entries 5, wherein a first buffer entry 5' is represented by the uppermost buffer entry, and accordingly, a last buffer entry 5" can be found at the bottom of the schematic stack buffer entries 5.

The buffer CRA_0, as well as any other buffer CRA_1, CRA_2, ... of the pool CRA, comprises control information such as a valid bit V, a sequence pointer nxt_b_nr, a location pointer loc_nr, and a buffer identifier b_nr.

Figure 5A:
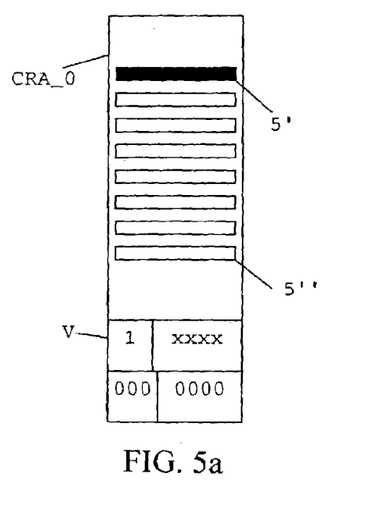
FIG. 5a shows the buffer CRA_0 depicted in FIG. 4 with the first buffer entry 5' used.
Figure 5B:
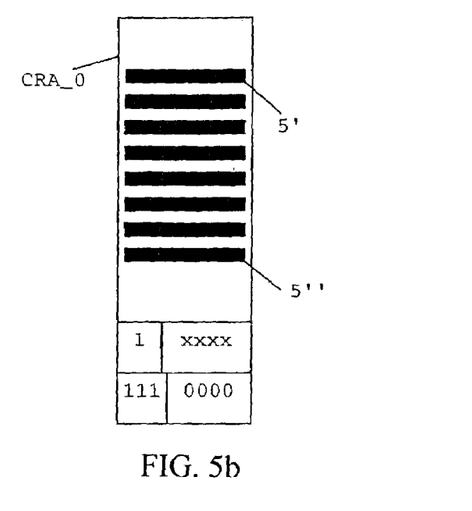
FIG. 5b shows the buffer CRA_0 for FIG. 4 with all buffer entries used.

The valid bit V is set whenever a first buffer entry 5' has been written to the previously unused, free buffer CRA_0. Accordingly, the valid bit V is reset if the last used buffer entry 5' of the buffer CRA_0 has been read from said buffer CRA_0 thus leaving an empty buffer CRA_0 again. Summarizing, the valid bit V indicates whether a buffer of said pool CRA is currently being used or not. For example, in FIG. 5a, a first entry 5' has been written to the buffer CRA_0 and the valid bit V has been set accordingly.

The buffer identifier b_nr is used for distinguishing between the buffers CRA_0, CRA_1, ... within said pool CRA of buffers CRA_0, CRA_1, .... Therefore, each of said buffers CRA_0, CRA_1, ... is to be assigned a unique buffer identifier b_nr. FIG. 5f shows four buffers CRA_0, ..., CRA_3, and it can be seen that the buffer CRA_0 has the binary coded buffer identifier b_nr set to 0001. Another buffer, buffer CRA_1 has a buffer identifier b_nr set to the value 0001, and so on.

Altogether, in a pool CRA there are n_CRA buffers CRA_0, CRA_1, ..., CRA_n_CRA-1, and the buffer identifier b_nr is binary coded. Since binary coding of the buffer identifier b_nr requires ld (n_CRA) bits, wherein ld (x) is defined as the logarithmus dualis of x, n_CRA is preferably chosen to be a power of two. However, the method of choosing n_CRA described hereinafter most probably yields values for n_CRA that are no power of two. Nevertheless, the advantages associated with the way of calculating n_CRA are highly desirable, so that choosing n_CRA as a power of two becomes less important.

A sequence pointer nxt_b_nr, also being part of buffer CRA_0, is used for identifying a subsequent buffer, e.g. buffer CRA_1. If all buffer entries 5 of the buffer CRA_0 are already used (cf. FIG. 5c), and the address information of a new packet has to be stored, a free buffer CRA_1 is allocated by an address data manager controlling the pool CRA. The valid bit V of said buffer CRA_1 is set, and the sequence pointer nxt_b_nr of the buffer CRA_0 is assigned the value of the buffer identifier b_nr of CRA_1.

The crossbar switch 1 of FIG. 2 supports p=4 different priority levels. For each priority level, there is a separate read pointer that indicates—for the associated priority—the buffer to use for the next read operation. Therefore, the read pointer has the value of the buffer identifier b_nr of the corresponding buffer. The exact buffer entry for the next read operation is specified by a location pointer loc_nr (FIG. 4).

The same mechanism is used for writing new entries to a buffer. For each priority, there is a separate write pointer that indicates the buffer to be used for the next write operation. A specific buffer entry is selected by means of the location pointer loc_nr of the corresponding buffer.

Figure 5C:
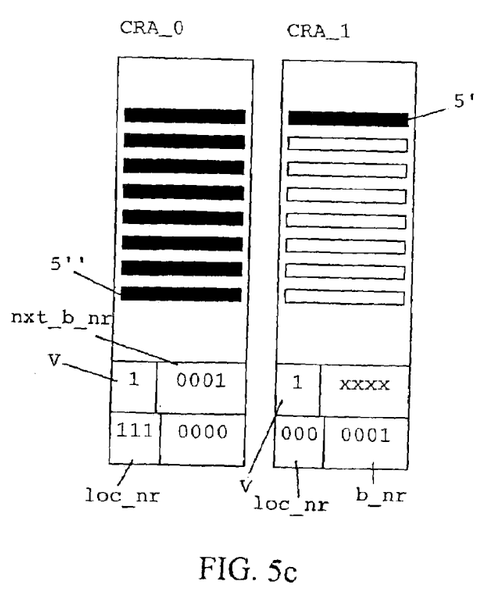
FIG. 5c shows the buffer CRA_0 for FIG. 5b and a subsequent buffer CRA_1.
Figure 5D:
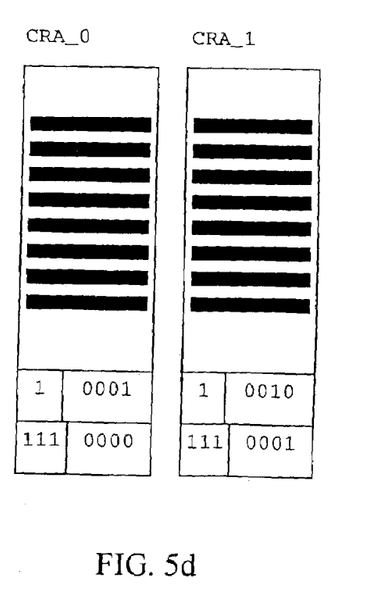
FIG. 5d shows the buffers CRA_0, CRA_1 with all buffer entries being used.
Figure 5E:
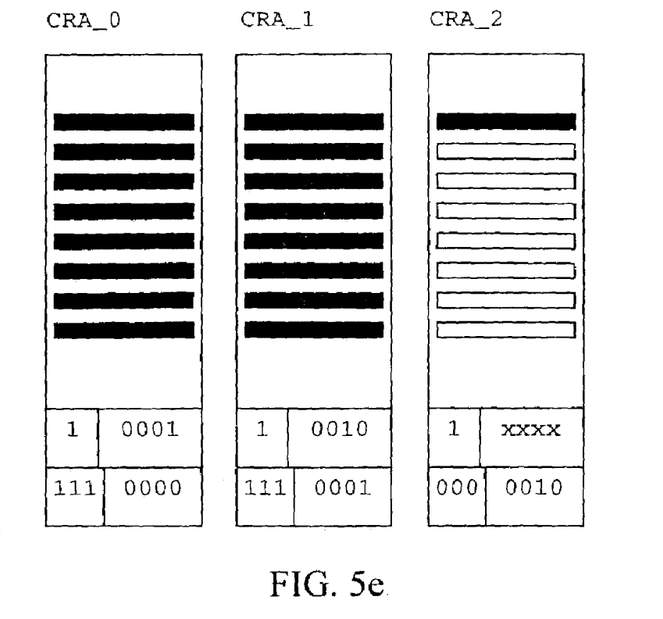
FIG. 5e shows three subsequent buffers CRA_0 to CRA_2.
Figure 5F:
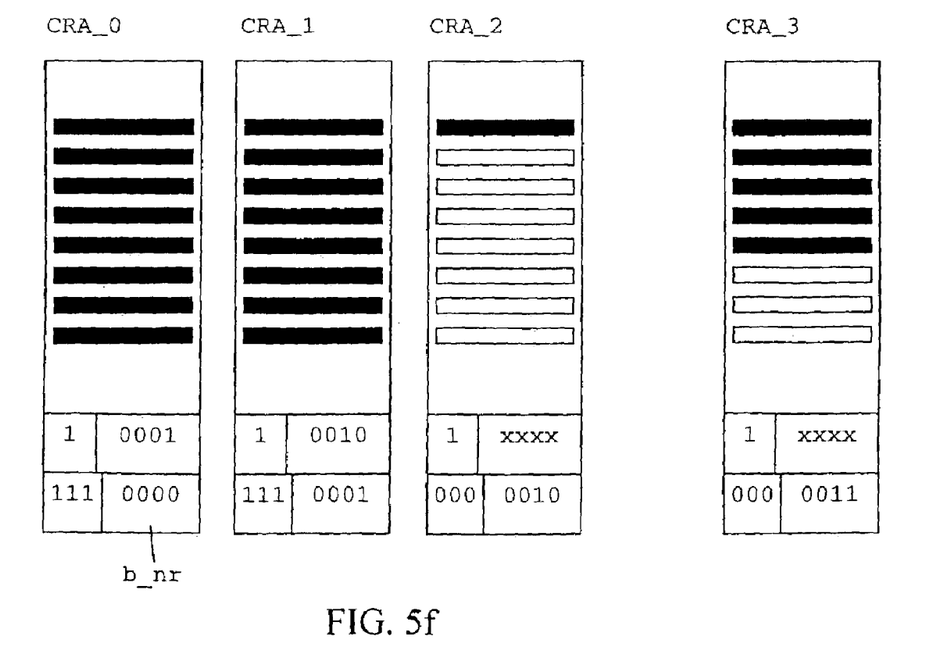
FIG. 5f shows the buffers CRA_0 to CRA_2 depicted in FIG. 5e plus a fourth buffer CRA_3 used for storing address information of packets having a different priority.

For instance, the location pointer loc_nr of buffer CRA_1 of FIG. 5c has the value 0, which denotes, that the first buffer entry 5' has been written. As can be seen from buffer CRA_0 of FIG. 5c, the location pointer of a full buffer has the binary value 111 (based on e_CRA=8 buffer entries within buffer CRA_0) which corresponds to 7_dec, indicating that the last buffer entry 5" of the buffer CRA_1 has been written.

Address information of packets having the same priority is stored in this way in subsequent buffers linked with each other via said sequence pointers nxt_b_nr.

The scenario of FIG. 5f shows three buffers CRA_0 to CRA_2 that are linked with each other. A total number of seventeen packets' address information has been written to said buffers CRA_0 to CRA_2. Each of the seventeen corresponding packets is of priority level p1.

There are also five buffer entries within a fourth buffer CRA_3. They correspond to data packets of priority p2 and they have a separate read/write pointer. An incoming packet having yet another priority level, e.g. p3, would require an unused buffer to be allocated by the address data manager out of said pool CRA.

This way of storing packet data of different priority levels enables to use a simple control logic with several read/write pointers which at the same time requires fewer buffer entries as compared to state-of-the-art systems.

It has been found, that based on several input values such as the number p of different priority levels, the number g_CRA of data buffer entries and the number e_CRA of buffer entries per buffer, the number n_CRA of buffers within said pool CRA can be found such that even in the worst case there are enough buffers CRA_0, CRA_1, . . . with a corresponding number e_CRA of buffer entries to store address information of each information packet. Due to the flexible buffer management and the pool CRA of buffers, the overall number of buffer entries required is very small compared to known crossbar switch technology.

Evaluating the equation $$n\_CRA = \sum_{\substack{i=1, \\ 2 \cdot i < g\_CRA}}^{p-1} 2 \cdot i + \begin{cases} int(a) + 1, & \text{if } a = int(a) \\ int(a) + 2, & \text{if } a \neq int(a) \end{cases}$$

wherein $$a = \frac{g\_CRA - 2 \cdot (p-1) - 1}{e\_CRA}$$

yields the minimum number n_CRA of buffers required in said pool of buffers. For instance, if there are p=4 priority levels, g_CRA=32 data buffer entries and e_CRA=8 buffer entries, the equation yields n_CRA=11 buffers CRA_0, . . . , CRA_10. The total number of buffer entries per crosspoint within the control logic 2 of the crossbar switch 1 is n_CRA*e_CRA=88, which is considerably smaller than 4*32=128 which is the number of buffer entries that would be necessary for a data buffer comprising the minimum number of thirty-two buffer entries in each of the four FIFO-buffers each of which is assigned to one priority level in prior art.

Figure 6:
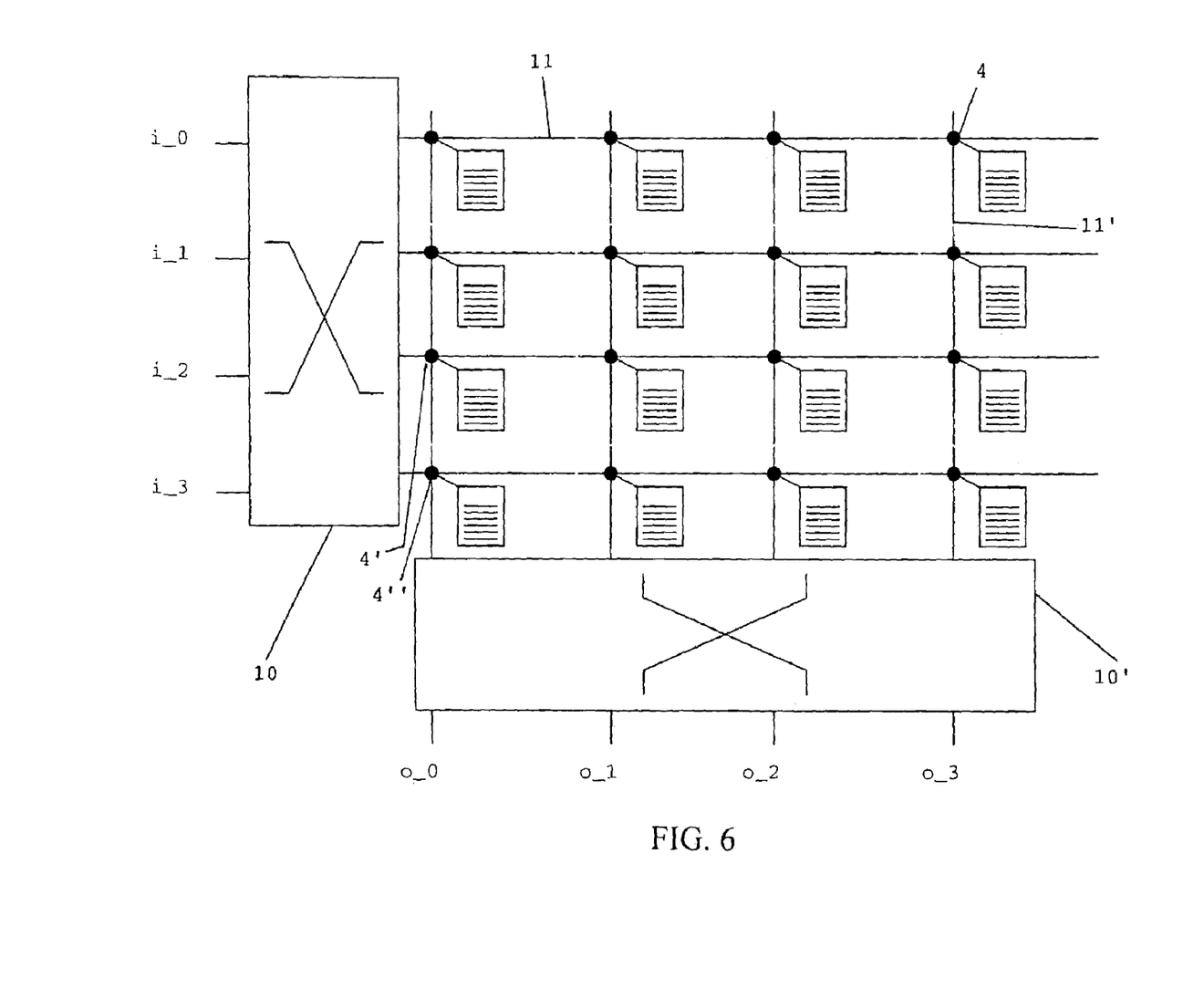
FIG. 6 shows a segment of a crossbar switch comprising sixteen crosspoints 4 and two auxiliary crossbar switches 10, 10'.

FIG. 6 shows a part of the control logic 2 of a crossbar switch 1 comprising sixteen crosspoints 4 and two auxiliary crossbar switches 10, 10'. As can be seen, the auxiliary crossbar switch 10 is placed between the input ports i_0 to i_3 and the corresponding input crossbars 11. The auxiliary crossbar switch 10' is placed between the output ports o_0 to o_3 and the corresponding output crossbars 11'.

The auxiliary crossbar switch 10 enables a packet arriving at e.g. input port i_2 to be routed to a crossbar assigned to e.g. i_0. This feature is of special advantage when operating the crossbar switch in a link paralleling mode.

Usually, the address information of a packet is temporarily stored to a buffer assigned to the respective crosspoint 4 and all buffers along an output crossbar 11' are polled cyclically in a so-called round-robin order for preparing output operation.

In a LP4 link paralleling mode, the input ports i_0 to i_3 are put together forming a virtual port having the quadruple bandwidth as compared to a single, physical input port. This holds true, if there is no idle packet in a packet stream, i.e. if at each input port i_0, . . . , i_3 packets are arriving all the time.

Should there be an idle packet incoming at input port i_2, which means that in the respective cycle no information packet is to be routed to an output port, there would be no packet in the corresponding crosspoint 4' to be output to the output port o_0, for instance. However, since all the buffers along an output crossbar 11' are polled in round-robin order, the buffer of crosspoint 4' will also be polled. Since in this cycle only an idle packet has arrived, no packet is to be output at output port o_0. After polling the buffer of crosspoint 4', according to the round-robin order, crosspoint 4" is polled. This crosspoint 4" has in its buffer a packet to be output at output port o_0.

According to the invention, the overall performance can be improved, if the packet to be stored in the buffer of crosspoint 4" is routed to the buffer of crosspoint 4' instead by the auxiliary crossbar switch 10. In this way, outputting three packets takes three cycles, whereas state of the art crossbar switches require four cycles to output the same three packets.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method of operating a crossbar switch having a control logic, n input ports and m output ports, said input ports and said output ports being connected at crosspoints, said method comprising:
   routing information packets of p different priority levels from said n input ports to said m output ports;
   providing for each crosspoint a data buffer array for storing said information packets;
   providing for each crosspoint a CRosspoint Address (CRA) pool of buffers (CRA_0, CRA_1, . . . ) within said control logic;
   temporarily storing address information related to said information packets in said CRA pool of buffers (CRA_0, CRA_1, ... ), said address information indicating the address of information packets in said data buffer array; and monitoring or controlling the availability of said buffers (CRA_0, CRA_1, ... ) in said CRA pool by an address data manager.

2. The method according to claim 1 further comprising providing each of said CRA pool buffers (CRA_0, CRA_1, ... ) with the same number e_CRA of buffer entries.

3. The method according to claim 1 wherein said CRA pool buffers are provided with different numbers of buffer entries.

4. The method according to claim 1 wherein said CRA pool buffers (CRA_0, CRA_1, ... ) operate as FIFO-buffers.

5. The method according to claim 1 comprising using p_wp write pointers within said CRA pool each of which indicates a write location for the corresponding priority level.

6. The method according to claim 5 comprising using p_rd read pointers within said CRA pool, each of which indicates a read location for the corresponding priority level.

7. The method according to claim 6 wherein said read or write pointer(s) comprise(s) buffer identifier information or location information.

8. The method according to claim 1 comprising setting a valid bit of a CRA pool buffer if a first buffer entry has been written to said buffer.

9. The method according to claim 1 comprising resetting a valid bit if a last used buffer entry of a CRA pool buffer has been read from said CRA pool buffer.

10. The method according to claim 1 comprising assigning a value of a buffer identifier of a second CRA pool buffer to a sequence pointer of a first CRA pool buffer.

11. The method according to claim 1 comprising assigning a location pointer to each of said CRA pool buffers.

12. The method according to claim 1 comprising rearranging information packets according to a predetermined mode by using at least one auxiliary crossbar.

13. A method of operating a crossbar switch having a control logic, n input ports and m output ports, said input ports and said output ports being connected at crosspoints, said method comprising:

routing information packets of p different priority levels from said n input ports to said m output ports;

providing for each crosspoint a CRosspoint Address (CRA) pool of buffers (CRA_0, CRA_1, ... ) within said control logic;

temporarily storing address information related to said information packets in said CRA pool of buffers (CRA_0, CRA_1, ... );

monitoring or controlling the availability of said buffers (CRA_0, CRA_1, ... ) in said CRA pool by an address data manager;

providing each of said buffers (CRA_0, CRA_1, ... ) with the same number e_CRA of buffer entries wherein a number n_CRA of buffers (CRA_0, CRA_1, ... , CRA_m_CRA-1, ... ) in said CRA pool is determined by the equation:

$$n\_CRA = \sum_{\substack{i=1 \\ 2 \cdot i < g\_CRA}}^{p-1} 2 \cdot i + \begin{cases} int(a) + 1, & \text{if } a = int(a) \\ int(a) + 2, & \text{if } a \neq int(a) \end{cases}$$

wherein $$a = \frac{g\_CRA - 2 \cdot (p-1) - 1}{e\_CRA}$$

and wherein g_CRA denotes a maximum number of information packets that can be stored in a data buffer related to a crosspoint.

14. Crossbar switch comprising:

control logic;

n input ports;

m output ports, said input ports and said output ports being connected at crosspoints;

information packets of p different priority levels being routed from said n input ports to said m output ports;

a data buffer array for each crosspoint for temporarily storing said information packets;

a CRosspoint Address (CRA) pool of buffers (CRA_0, CRA_1, ... ) within said control logic for each crosspoint for temporarily storing address information related to said information packets in said CRA pool of buffers (CRA_0, CRA_1, ... ), said address information indicating the address of said information packets in said data buffer array; and an address data manager monitoring or controlling the availability of said buffers (CRA_0, CRA_1, ... ) in said CRA pool.

15. The apparatus according to claim 14 further comprising providing each of said CRA pool buffers (CRA_0, CRA_1, ... ) with the same number e_CRA of buffer entries.

16. The apparatus according to claim 14 wherein said CRA pool buffers are provided with different numbers of buffer entries.

17. The apparatus according to claim 14 wherein said CRA pool buffers (CRA_0, CRA_1, ... ) operate as FIFO-buffers.

18. The apparatus according to claim 14 comprising p_wp write pointers within said CRA pool, each of which indicates a write location for the corresponding priority level.

19. The apparatus according to claim 18 comprising p_rd read pointers within said CRA pool each of which indicates a read location for the corresponding priority level.

20. The apparatus according to claim 19 wherein said read or write pointer(s) comprise(s) buffer identifier information or location information.

21. The apparatus according to claim 14 comprising a valid bit of a buffer which is set if a first CRA pool buffer entry has been written to said CRA pool buffer.

22. The apparatus according to claim 14 comprising a valid bit which is reset if a last used CRA pool buffer entry of a CRA pool buffer has been read from said CRA pool buffer.

23. The apparatus according to claim 14 comprising a buffer identifier assigning a value of a second CRA pool buffer to a sequence pointer of a first CRA pool buffer.

24. The apparatus according to claim 14 comprising a location pointer assigned to each of said CRA pool buffers.

25. The apparatus according to claim 14 comprising information packets rearranged according to a predetermined mode by using at least one auxiliary crossbar.

26. Crossbar switch comprising:
control logic;
n input ports;
m output ports, said input ports and said output ports being connected at crosspoints;
information packets of p different priority levels being routed from said n input ports to said m output ports;
a CRosspoint Address (CRA) pool of buffers (CRA_0, CRA_1, . . . ) within said control logic for each crosspoint for temporarily storing address information related to said information packets in said CRA pool of buffers (CRA_0, CRA_1, . . . ); and
an address data manager monitoring or controlling the availability of said buffers (CRA_0, CRA_1, . . . ) in said CRA pool; and
providing each of said buffers (CRA_0, CRA_1, . . . ) with the same number e_CRA of buffer entries wherein a number n_CRA of buffers (CRA_0, CRA_1, . . . , CRA_m_CRA-1) in said CRA pool is determined by the equation:

$$\text{n\_CRA} = \sum_{\substack{i=1, \\ 2 \cdot i < \text{g\_CRA}}}^{p-1} 2 \cdot i + \begin{cases} int(a) + 1, & \text{if } a = int(a) \\ int(a) + 2, & \text{if } a \neq int(a) \end{cases}$$

wherein $$a = \frac{\text{g\_CRA} - 2 \cdot (p-1) - 1}{\text{e\_CRA}}$$

and wherein g_CRA denotes a maximum number of information packets that can be stored in a data buffer related to a crosspoint.

* * * * *